3,798,303
METHOD FOR THE PRODUCTION OF URANIUM MONOCARBIDE
Yumi Akimoto, Omiya, and Koji Tanaka, Urawa, Japan, assignors to Mitsubishi Kinzoku Kogyo Kabushiki Kaisha, Tokyo-to, Japan
No Drawing. Filed May 18, 1970, Ser. No. 38,604
Claims priority, application Japan, May 27, 1969, 44/40,579
Int. Cl. C01g 43/00
U.S. Cl. 423—5    3 Claims

ABSTRACT OF THE DISCLOSURE

An improved method for the production of uranium monocarbide adapted to manufacture a nuclear fuel and having a composition of high density, a carbon content of which is approximately equivalent to the stoichiometric composition, in which uranium carbide as a raw material is subjected to fusing treatment by an inert plasma flame consisting of argon and hydrogen, thereby to carry out fusing of the carbide and control of carbon content of said carbide in one step.

BACKGROUND OF THE INVENTION

The present invention relates to an improved method for the production of uranium monocarbide adapted to manufacture a nuclear fuel.

For the purpose of manufacturing nuclear fuel from uranium carbide, it is conventional to adopt the so-called two-step method, in which a carbide is first prepared by subjecting a mixture of a uranium oxide and carbon to carbothermic reaction or by subjecting metallic uranium to carbonization with carbon or a hydrocarbon, and then the thus prepared carbide is shaped by subjecting it to sintering or casting. On the other hand, in the case when the nuclear fuel, prepared by packing uranium carbide or uranium-plutonium carbide in a metal sheath is used, desirable composition thereof corresponds to the case where C/metal ratio=1.0. However, since the composition range of the uranium carbide or uranium-plutonium carbide is very narrow, when the carbon content is higher or lower than the desirable range, a second phase such as $U_2C_3$, $UC_2$ or U metal is second deposited besides the UC phase or (U.Pu)C phase and the deposited phases react with the coating material at a high temperature, thus causing rapid deterioration of the coating material. However, in the case of conventional methods, the production process contains various causes for varying the ratio C/U and furthermore there is no means capable of controlling the compositional ratio in the final process step, so that fluctuation of the ratio C/U in the final product cannot be avoided even if the C/U ratio of the raw material is carefully controlled and accordingly, it has been regarded to be impossible to avoid deposition of the second phase in the final product.

There are various causes for undesirable fluctuation in the C/U ratio, such as purity of the raw material, adsorption of gas, evaporation of metal and carbon at a high temperature, impurities introduced from external atmosphere, and the like. Particularly, since uranium carbide of powdery state has a high chemical activity, it is conventional to treat the powdery material in a glove-box filled with an inert gas. However, reactions through utilizing minor oxygen impurities and hydrolysis reaction with water traces in the glove-box not only cause increase in oxygen content as an impurity, but also fluctuation of the C/U ratio due to CO gas generated in the succeeding high temperature treatment such as sintering. Consequently, for the purpose of production of uranium monocarbide, a highly pure atmosphere is required for preventing the raw material from being contaminated by oxygen. The formation and maintenance of such highly pure atmosphere necessitate a dry-box having a large capacity and incorporating therein powder treatment devices as well as a large amount of inert gas, and purity maintenance due to circulatory purification in the dry-box, necessitates large site-surface for such equipment. Even if the most careful attention is paid to establishment of the favorable atmosphere mentioned above and further to combination of raw materials, said combination being determined by taking carbon loss during the processes into consideration, it has been regarded as difficult to control the fluctuation of the ratio C/U to a value below 0.1–0.05 weight percent. Accordingly, for the purpose of controlling composition range of the final product more than the above-mentioned fluctuation value of 0.1–0.05 weight percent or reproducibility of UC in a single phase, it becomes indispensably necessary to provide a method of controlling the ratio C/U in the final step of the production method.

Fusion of the produced carbide seems to impart an advantageous effect to the composition control during the final step. Impurity oxygen contained in the uranium carbide can be made to be substantially zero in the state of thermodynamic equilibrium by subjecting said uranium carbide to fusion. The thus obtained highly pure UC product is remarkably stable in comparison with powdery product or sintered product, and furthermore the highly pure UC product does not require the highly pure atmosphere mentioned for its succeeding treatments. However, control of the ratio C/U by fusion is somewhat limited by the fact that evaporation of UC or (U.Pu)C is not a congruent evaporation. That is, when UC, the ratio (C/U) of which is equal to 1.0, is heated to a high temperature, the ratio C/U of a gas phase in equilibrium with the UC is lower than 1.0. Accordingly, the ratio C/U of the specimen itself increases gradually from 1.0 with the progression of the evaporation. On the other hand, for example, the ratio C/U of a gas phase in equilibrium, at a high temperature, with the carbide having a ratio (C/U=1.5) is larger than 1.5, thus causing gradual decrease in the ratio C/U of a specimen of solid phase from 1.5. As mentioned above, in the carbides of all compositions, the ratio C/U of the solid phase is gradually varied with progression of the evaporation, whereby the ratio C/U of a gas phase and that of the solid phase are gradually converted to an equal value, that is, composition of the carbide is converted to the congruent evaporation composition. It is a great problem in the production of a compound, in which C/U=1.0 that, with respect to UC, the congruent evaporation composition does not correspond to C/U=1.0, but to C/U=1.1. That is, composition control by fusing treatment is possible in one direction only, so that, for the purpose of obtaining a relationship corresponding to C/U=1, a raw material, the ratio C/U of which is smaller than 1, should be used. This fact hinders using the carbothermic reaction, which is the most inexpensive method, in the production of carbide. Furthermore, in the case of using the fusing treatment, it is necessary to provide means adapted to stop the fusing treatment at the instant when C/U becomes 1. In practice, however, estimation of the fusing period of time required for obtaining the state of (C/U=1) is very difficult, and moreover if the ratio C/U exceeds 1, the composition of the raw material to be fused should be again readjusted to the appropriate composition.

SUMMARY OF THE INVENTION

Therefore, an essential object of the invention is to provide an improved method adapted to carry out composition control by a fusion treatment in both directions capable of increasing and decreasing, respectively, the ratio C/U, thereby to avoid composition limitation of the raw material to be fused.

According to the invention, the above-mentioned object has been effectively attained by using an inert plasma flame for the fusion treatment in the final step, said flame being prepared by adding hydrogen of a quantity below twenty volume percent to an inert gas forming said plasma flame. This flame is adopted to fuse uranium carbides as the raw material thereby to control carbon content of the uranium carbide and to promote the fusion of the material.

The foregoing object and other objects as well as the characteristic features and functions of the invention will become more apparent and more readily understandable by the following description and the appended claims.

DETAILED DESCRIPTION OF THE INVENTION

According to the invention, crude carbide prepared according to conventional methods is subjected to a fusion treatment by means of a plasma gas prepared from mixture of argon hydrogen. The reduction of the carbide and composition-conversion due to evaporation is controlled by adjusting the amount of hydrogen contained in the plasma gas so that the ratio C/U approaches a value equal to 1. This method is particularly effective in the case where a carbide raw material having a large carbon content is adopted. This effectiveness is based on the fact that the rapid decarbonization action of the plasmatic hydrogen and uranium carbide melt is added to the evaporation action intrinsic to the uranium carbide melt itself, so that composition of the fused carbide rapidly becomes the congruent evaporation composition, and furthermore, when the decarbonization reaction further proceeds, a melt of uranium monocarbide (UC 1.00) can be obtained from a composition having a larger carbon content, which would have been impossible in the conventional fusing operation.

As will be apparent from the later examples of the invention, when a carbide containing 5.60±0.05 weight percent of carbon is subjected to fusion by using argon plasma or a plasma consisting of mixtures of argon and hydrogen, the following results are recognized. That is, in the case of using the argon plasma, a composition (5.02±0.5 weight percent) which is regarded as having attained an equilibrium state is established within about ten minutes and decarbonization no longer proceeds; but in the case of using the latter plasma mixtures, the composition approaches the stoichiometric composition containing carbon of 4.77 weight percent and the decarbonization reaction can be made to proceed further by continuing the fusion treatment. Now, if a raw monocarbide having a composition, near its theoretical carbon content, is subjected to fusing treatment by using a plasma flame with a hydrogen content which is variously set, the decrease in the carbon content is clearly recognized and the rate of the decrease depends upon the added hydrogen content.

Particularly, the form or density of the melt under the fusion treatment varies depending on presence or non-presence of the added hydrogen. This fact also is an important characteristic feature of the invention. That is, in the case of fusing treatment by plasma flame containing hydrogen mixed thereto, the specimen forms a uniform melt, but in the case of fusing treatment by plasma flame consisting of only argon, all parts of the specimen are not fused in spite of the same output as in the former case, a condensation phase appears at one portion, thus necessitating an additional treatment in order to uniformly fuse the specimen, for example, some operation for moving the specimen. According to our experimental conditions, the quantity of the specimen for obtaining a uniform melt was only 3 g. in the case of using a plasma flame containing only argon, but a uniform melt at more than 8 g. could be obtained in the case of using an argon plasma flame, to which hydrogen is mixed.

From the above-mentioned fact, it has been confirmed that the entropic increase in a plasma flame due to the hydrogen addition has an advantageous effect of promoting the fusing, but the addition of an excess quantity of hydrogen causes boiling of the melt, thereby scattering the melt because of vigorous entropic increase of the plasma flame. Consequently, for the purpose of carrying out the fusing treatment in a stable manner, the quantity of the hydrogen to be added should be limited to at most 20% by volume. Furthermore, the plasma gas stream makes it possible to rapidly entrain the volatile components which are impurities contained in the uranium carbide, so that this character of the plasma gas stream is effective for the removal of any oxygen or nitrogen which is liable to be mixed in the melt as impurities. That is, in the method of the invention, addition of an appropriate quantity of hydrogen to an inert gas plasma causes various advantages such as easy production of a desired composition, promotion of the removal of impurities, and remarkable improvement of fused state of the melt, thus enabling production of a uniform carbide having a high density.

The invention will be described in detail in connection with the following examples.

Example 1

Mixtures of $UO_{2.00}$ and carbon powder were prepared by varying the carbon content to an equivalent value and to a value less or larger than said equivalent value in accordance with the following equation $$UO_{2.00} + 3C = UC + 2CO$$

and then the mixtures were sufficiently pulverized. The thus pulverized mixtures, after their molding under pressure, were subjected to a carbothermic reaction in a vacuum atmosphere for ten hours at a temperature of 1,800° C., whereby uranium carbide having a composition corresponding substantially to the stoichiometric ratio and containing 4.77 weight percent of carbon and uranium carbides having hyper or normal stoichiometric compositions were obtained. Any impurity of the thus produced product was mainly oxygen, the quantity of which was within the range between 2,000 and 3,000 p.p.m. (weight).

3.0 g. potions each of the uranium carbides produced as above were put in a separate water-cooled crucible and then subjected to fusion treatment by a plasma flame prepared by mixing argon and hydrogen, and having a flow rate of 15 l./min. The fusion treatment was continued for five, ten, and fifteen minutes, respectively, in the respective cases corresponding to various combination of the raw material components and plasma gas composition. After cooling of the fused products, the specimens were separated into two portions, one of which was pulverized and used for chemical analysis and X-ray analysis, and the other of which was used for density measurement and microscopic composition-inspection.

In the case of the fusing treatment by a plasma flame consisting of only argon, the uranium carbide, the carbon content of which is lower than that of the stoichiometric composition, had varied its composition with the fusing period of time, whereby the carbon content had transferred to a value higher than the theoretical carbon content, but in the case of the composition carbon, the content of which was initially 4.40 weight percent, the carbon content had reached 4.80 weight percent after fusing for ten minutes and furthermore, after continuation of said fusing until fifteen minutes the carbon content had reached 4.90 weight percent.

On the other hand, when a composition having a high carbon content above stoichiometric was used as the raw material to be fused, raw materials having compositions containing, respectively, 5.60 and 5.29 weight percent of carbon, the carbon content decreased with the fusing period of time, but after fusing for ten minutes, the carbon content had reached 5.03 weight percent. Even if fusion was continued further from said ten minutes, the carbon content did not decrease further. That is, this composition seems to be the congruent evaporation composition. However, in the case of fusion treatment by a plasma gas prepared by mixing argon and four volume percent of hydrogen, a rapid decrease in carbon content appeared even after continuation of fusing treatment for five minutes only, and the carbon content had decreased to 4.78 weight percent and 4.60 weight percent, respectively, after continuation of the fusing treatment for ten minutes and for fifteen minutes. That is, when raw materials having compositions containing, respectively, 5.29 and 5.60 weight percent of carbon were used, uranium monocarbide having stoichiometric composition was obtained by fusing the raw material for ten minutes with a plasma flame consisting of four weight percent hydrogen in argon. This fact indicates that, even if the raw material has a composition containing a high carbon content, production of uranium monocarbide having theoretical carbon content has been made possible by a fusion with a plasma gas flame of argon and hydrogen.

EXAMPLE 2

In the Example 1, it has been confirmed that only four volume percent of hydrogen is sufficient for fusing a 3 g. specimen having high carbon content. However, this Example 2 illustrates the most appropriate condition for obtaining uranium monocarbide when the fused amount and fusing period of time are taken, respectively, as 8.2 g. and five minutes. Preparation and treatment of the raw material and experimental procedure were equivalent to those of Example 1. The results are indicated in the following Table I, in which compositions prior to and after the fusing treatment were traced according to chemical analysis and converted to atomic ratio.

TABLE I

| | Composition of— | | | | | | |
|---|---|---|---|---|---|---|---|
| | Raw material, $U_{1.00}C_xO_y$ | | Plasma gas, volume percent | | Product, $U_{1.00}C_xO_y$ | | Relative theoretical density (percent)[1] |
| | $x$ | $y$ | $H_2$ | Ar | $x$ | $y$ | |
| Specimen number: | | | | | | | |
| 1 | 0.965 | 0.048 | 0 | 100 | 0.968 | 0.015 | 98.8 |
| 2 | 1.031 | 0.039 | 10 | 90 | 1.004 | 0.017 | 99.0 |
| 3 | 1.031 | 0.039 | 13 | 87 | 0.995 | 0.013 | 99.3 |
| 4 | 1.031 | 0.039 | 15 | 85 | 0.990 | 0.014 | 99.1 |

[1] UC theoretical density 13.32 g./cc.

As is clear from the Table I, a noteworthy difference can be recognized in the form or density of the melt resulting from the fusion treatment, this difference in density being an important characteristic feature of the fusion process according to the invention.

In the case of fusing, specimen No. 1 in the Table I utilizing argon plasma flame, the melt was puffed out over the crucible during the fusing process and a condensation phase appeared at the peripheral part of the flame, so that the crucible was subjected to movement so as to carry out uniform fusing, but carbon content of the melt had scarcely varied. On the contrary, in all the other specimens (Nos. 2, 3, 4 in Table I) utilizing the plasma flame containing hydrogen besides argon, a spherical melt enveloped by the plasma flame was formed and a stable fusing operation was established. In the specimen of No. 1, there was the least change in the carbon content due to the fusion treatment, but in the cases of the specimens Nos. 2, 3 and 4, the composition of the product reached substantially the composition of uranium monocarbide, so that it can be confirmed that hydrogenation is very effective for promoting the fusion.

Among the Table I, with respect to the product of No. 3, the composition of UC corresponds to the stoichiometric composition within the permissible range of error (±0.05 weight percent). This final product is an excellent uranium monocarbide having single phase and high density which is apparent from the result of microscopic composition-inspection of said product and the lattice constant of the product due to X-ray was 5,960 A.

As is apparent from the results in Examples 1 and 2, when carbides having carbon contents lower than the stoichiometric quantity are used as starting materials they can be treated in the inert gas plasma flame until they exceed the stoichiometric carbon content and then the carbon content can be reduced to the stoichiometric amount by the addition of from 4 to 20 volume percent of hydrogen to the inert gas feeding the plasma flame.

We claim:
1. A method for the production of uranium monocarbide from crude uranium carbides of variable carbon content which comprises the steps of fusing said uranium carbides in an inert gas plasma flame until the carbon content of said uranium carbides is in excess of the stoichiometric proportions in the monocarbide; adding up to 20 volume percent of hydrogen to said inert gas and continuing the fusion of said uranium carbides in said inert gas/hydrogen plasma to deoxygenize and reduce the carbon content of said fused carbide to the stoichiometric proportions of uranium monocarbide then removing said fused uranium monocarbide from said flame, cooling same and recovering as a fused mass crystalline uranium monocarbide.

2. The method according to claim 1 wherein said crude uranium carbide is prepared by reacting uranium oxide with carbon.

3. The method according to claim 1 wherein said inert gas is argon.

References Cited
UNITED STATES PATENTS

| 3,340,020 | 9/1967 | Neuenschwander et al. _ 23—349 |
| 3,272,600 | 9/1966 | Sowder et al. _____ 23—349 |
| 3,296,355 | 1/1967 | Beucherie et al. _____ 23—349 |
| 3,070,420 | 12/1962 | White et al. _____ 264—0.5 |
| 3,288,572 | 11/1966 | Fontana _____ 23—349 |

FOREIGN PATENTS

| 1,014,484 | 12/1965 | Great Britain _____ 264—0.5 |

CARL D. QUARFORTH, Primary Examiner
F. M. GITTES, Assistant Examiner

U.S. Cl. X.R.
252—301.1 R; 264—0.5; 423—256